(12) United States Patent
Camp, Jr. et al.

(10) Patent No.: US 7,864,043 B2
(45) Date of Patent: Jan. 4, 2011

(54) HOME LOCATING NETWORK

(75) Inventors: William O. Camp, Jr., Chapel Hill, NC (US); Bo Anders Angelhag, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 951 days.

(21) Appl. No.: 11/692,341

(22) Filed: Mar. 28, 2007

(65) Prior Publication Data

US 2008/0238661 A1 Oct. 2, 2008

(51) Int. Cl.
*G08B 1/08* (2006.01)
(52) U.S. Cl. .................. 340/539.13; 340/539.21; 340/825.49; 340/825.72; 455/414.1
(58) Field of Classification Search ............ 340/539.13, 340/825.69, 825.72, 7.55, 825.49, 539.21; 370/388, 252; 455/414.1, 41.2, 410
See application file for complete search history.

(56) References Cited

U.S. PATENT DOCUMENTS 6,563,430 B1 * 5/2003 Kemink et al. ......... 340/825.49

| 6,791,467 B1 * | 9/2004 | Ben-Ze'ev ............. 340/825.69 |
| 2004/0003098 A1 | 1/2004 | Coffy et al. |
| 2005/0094610 A1 | 5/2005 | de Clerq et al. |
| 2006/0025132 A1 | 2/2006 | Karaoguz et al. |

OTHER PUBLICATIONS

International Preliminary Report on Patentability for International Application No. PCT/IB07/002855 dated Oct. 8, 2009.
C. Di Flora et al.; "Indoor and Outdoor Location Based Services for Portable Wireless Devices," Distributed Computing Systems Workshops; Jun. 2005; pp. 244-250.

* cited by examiner

*Primary Examiner*—Anh V La
(74) *Attorney, Agent, or Firm*—Renner, Otto, Boisselle & Sklar, LLP

(57) ABSTRACT

A system, device and method for identifying, within a local area, a location of an electronic device, such as a mobile telephone, includes determining a signal characteristic of a wireless communication from one or more wireless devices in the local area to the electronic device, wherein determining is performed by the electronic device. Then, based on a comparison of the determined signal characteristic from the one or more wireless devices to a plurality of reference signal characteristics the location of the electronic device in the local area is determined.

26 Claims, 4 Drawing Sheets

| Highest Signal Strength | Alt 1 | Alt 2 | Alt 3 | Alt 4 | Alt 5 | Alt 6 |
|---|---|---|---|---|---|---|
| First | A | A | B | B | C | C |
| Second | B | C | A | C | A | B |
| Third | C | B | C | A | B | A |
| Location | Living room | Living room | Bed room | Bed room | Kitchen | Kitchen |

| Arbitrary Resulting Position | Measurement of A's signal strength | Measurement of B's signal strength | Measurement of C's signal strength |
|---|---|---|---|
| Living Room | 5-20% | 0-15% | 0-20% |
| Kitchen | 0-5% | 10-20% | 5-15% |
| Bedroom | 0-10% | 5-15% | 10-20% |
| Unknown | | | |

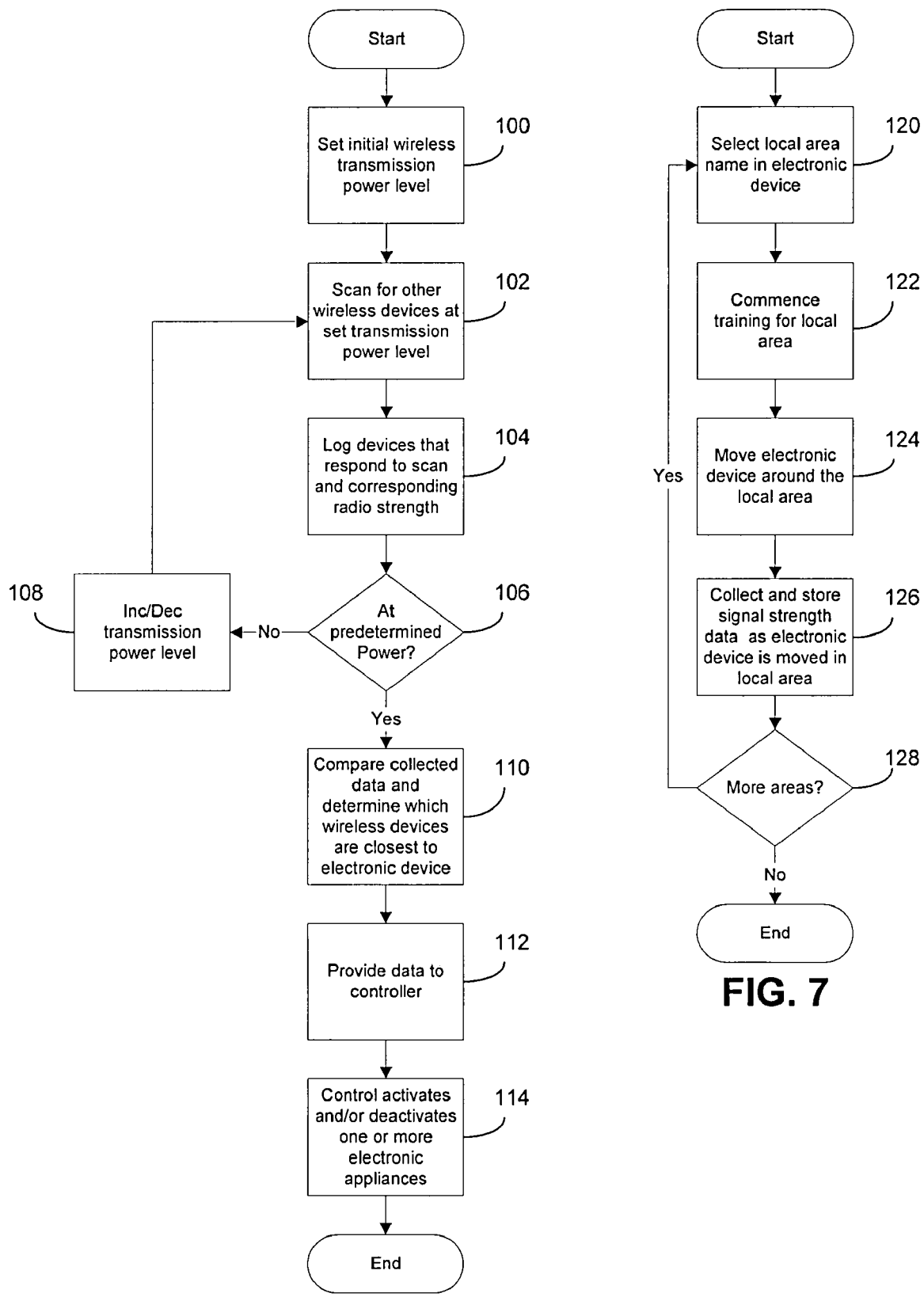

HOME LOCATING NETWORK

TECHNICAL FIELD OF THE INVENTION

The present invention relates generally to electronic devices, such as electronic devices for engaging in voice communications. More particularly, the invention relates to a system, device and method for determining a location within a local area.

DESCRIPTION OF THE RELATED ART

The digital era has digitized various electronic appliances, e.g., TV's, music systems, personal computer products (PC products), kitchen appliances, e.g., microwave ovens, etc. such that the operation thereof can be centrally controlled by a computer system. In other words, the computer system becomes the central hub or control system for the various digital electronic appliances. Therefore, the control of various digital electronic appliances can be simplified, which in turn can simplify the day-to-day activities of users of such electronic appliances.

The avalanche of digitized electronic appliances has made it possible to create digital local areas, e.g., digital homes or digital office locations, in which the various electronic appliances are tied into a more or less seamless multimedia environment. A digital local area such as a digital home may be an entire habitat with the user right at the center. Whatever the user's lifestyle, the digital home can make life more entertaining, more productive and more fun.

It would be desirable to control the various electronic appliances of a digital local area, e.g., the digital home, in dependence of the location of the user within the digital home. For example, it may be desirable to vary the behavior of lighting when the user enters a certain room of the home. Furthermore, it may be desirable to vary the behavior of a TV when the user enters the TV room. Still further, it may be desirable to control the behavior of a microwave oven or a refrigerator when the user is located in the kitchen.

SUMMARY

Conventionally, a location of a person or object may be determined using a global positioning system (GPS) or the like (e.g., by carrying or otherwise attaching a GPS receiver to the person/object). As is well known, a GPS receiver determines its terrestrial location by triangulating its position relative to GPS satellites in orbit around the earth, by receiving signals transmitted from the satellites, measuring the travel times of the signals from the satellites to the receiver, and then calculating the distances of the satellites from the receiver based on the travel time. While GPS receivers can be very accurate in determining position, they can become unreliable in indoor environments and, therefore, are not desirable for identifying a location of individuals within an indoor local area, such as a home or office.

Another way in which location may be determined is via WiFi based system. A WiFi based system, however, relies too much on precise location processes (e.g., locating the object within a few meters), and operation can suffer from too few transmitters in the local area.

The present invention provides a method, apparatus and system for using an electronic device (e.g., a mobile phone or the like) to determine a general location of an individual within a local area. For example, in a house that includes a number of rooms, the particular room in which the electronic device (and thus of an individual carrying the electronic device) is presently located can be identified. The exact location within the local area need not be provided. It is sufficient to simply provide a general location, e.g., the electronic device is or is not within a particular room of the local area. The general location then can be used to control electronic appliances, such as lighting systems, audio/video equipment, kitchen appliances, etc., in various rooms of the local area based on the location of the electronic device/individual.

To determine a location of an electronic device, such as a mobile phone or the like, the device scans a local area for other wireless devices, such as wireless routers, wireless access points, wireless appliances, etc. The scan can be performed at a plurality of different transmission power levels of the electronic device. A log or collection of data may be assembled for wireless devices that respond or do not respond. The log may include the responding wireless device's identifier, the responding device's signal characteristic (as determined by the electronic device), and the transmission power level utilized by the electronic device to perform the scan. The logged data then can be analyzed (e.g., compared to reference data) to determine a location of the electronic device in the local area. For example, the logged data can be used to determine which wireless device is closest to the electronic device, or an approximate location of the electronic device relative to the responding wireless devices. The determined location then can be communicated to a controller that controls the operation of one or more electronic appliances. Based on the location of the electronic device, the controller can operate the electronic appliances accordingly (e.g., turn on/or music, lights, etc. in different areas of a house).

According to one aspect of the invention, a method for identifying a location of an electronic device within a local area includes: determining a signal characteristic of a wireless communication from one or more wireless devices in the local area to the electronic device, said determining performed by the electronic device; determining the location of the electronic device based on a comparison of the determined signal characteristic from the one or more wireless devices to a plurality of reference signal characteristics.

According to another aspect of the invention, determining a signal characteristic includes: performing a wireless scan of the local area at a plurality of different transmission power levels; and logging an identifier and a responding signal characteristic of the one or more wireless devices that respond to the scan, and the transmission power level used to perform the scan.

According to another aspect of the invention, determining the location includes comparing the logged data for each wireless device to determine which wireless device is closest to the electronic device.

According to another aspect of the invention, determining the signal characteristic includes using a transmitter and receiver of the electronic device that are operative to implement at least one of a Bluetooth protocol or a WiFi protocol.

According to another aspect of the invention, the method further includes controlling at least one electronic appliance in the local area based on the location of the electronic device in the local area.

According to another aspect of the invention, controlling at least one electronic appliance includes controlling at least one of a television system, an audio system, a lighting system, a kitchen appliance, a home entertainment system, a personal computer system, a telephone system, or an alarm system.

According to another aspect of the invention, the at least one electronic appliances is controlled based on a profile associated with the electronic device and the at least one electronic appliance, said profile including at least one preferred setting for the electronic appliance.

According to another aspect of the invention, the method further includes prioritizing a plurality of profiles that are usable in the local area, wherein settings of at least one profile can override settings of another profile.

According to another aspect of the invention, the method further includes controlling the at least one appliance from a user interface on the electronic device.

According to another aspect of the invention, the method further includes changing, based on the determined location of the electronic device, at least one of a user interface of the electronic device or an operational characteristic of the electronic device.

According to another aspect of the invention, the method further includes prior to performing the scan, collecting the plurality of reference signal characteristics and storing said reference signal characteristics in memory.

According to another aspect of the invention, the method further includes: storing in the electronic device at least one invalid location; and when the determined location of the electronic device is at least partially in the at least one invalid location, changing the determined location to a valid location adjacent to the at least one invalid location.

According to another aspect of the invention, a method for using an electronic device to identify a location of the electronic device within a local area, wherein said electronic device includes a short range wireless transceiver includes: using the short range transceiver to scan for wireless devices in the local area; collecting in the electronic device an identifier of each wireless device that responds to the scan, and a signal characteristic of the responding wireless device; and determining the location of the electronic device in the local area based on the logged data.

According to another aspect of the invention, the scan is performed at least two different transmission power levels According to another aspect of the invention, a portable electronic device includes: a short range wireless transmitter and receiver; a scanning circuit operative to command the wireless transmitter and receiver to perform a scan for wireless devices in at least part of a local area, and to determine a signal characteristic of a response to the scan; a logging circuit operative to log in memory of the electronic device an identifier of the responding wireless devices and the corresponding signal characteristic; and a determination circuit operative to determine a location of the electronic device within the local area based on the logged data.

According to another aspect of the invention, the scanning circuit is further operative to perform the scan a plurality of different transmission power levels, and the logging circuit is operative to log each identifier and signal characteristic with the corresponding transmission power level.

According to another aspect of the invention, the determination circuit is operative to compare the logged data to reference data to determine which wireless device is closest to the electronic device.

According to another aspect of the invention, the wireless transmitter and receiver operate based on a Bluetooth protocol or a WiFi protocol.

According to another aspect of the invention, the electronic device further includes a control circuit operative to control at least one electronic appliance in the local area based on the determined location of the electronic device in the local area.

According to another aspect of the invention, the control circuit is operative to control the at least one electronic appliance based on a profile associated with the electronic device and the at least one electronic appliance, said profile including at least one preferred setting for the electronic appliance.

According to another aspect of the invention, the electronic device further includes a display for displaying a user interface, wherein the at least one appliance is controllable from the user interface.

According to another aspect of the invention, the control circuit is operative to change at least one of the user interface or an operational characteristic of the electronic device based on a location of the electronic device.

According to another aspect of the invention, at least one invalid location is stored in memory of the electronic device, and wherein when the determination circuit determines the location of the electronic device is at least partially in the at least one invalid location, the determination circuit changes the determined location to a valid location adjacent to the at least one invalid location.

According to another aspect of the invention, the electronic device is a mobile telephone.

According to another aspect of the invention, a system for controlling the operation of at least one electronic appliance within a local area includes: a portable electronic device configured to determine a location of the electronic device within a local area; a plurality of wireless devices arranged within the local area; a controller operatively coupled to the at least one electronic appliance, wherein the electronic device is operative to wirelessly provide the location of the electronic device within the local area to the controller, and the controller is operative to control the operation of the at least one electronic appliance based on the location of the electronic device in the local area.

According to another aspect of the invention, the at least one electronic appliances is controlled based on a profile associated with the electronic device and the at least one electronic appliance, said profile including at least one preferred setting for the electronic appliance.

According to another aspect of the invention, each profile associated with each electronic device in the local area is prioritized, and wherein settings of at least one profile can override settings of another profile.

According to another aspect of the invention, the electronic device, via a user input device, is operable to remotely control the at least one electronic appliance.

According to another aspect of the invention, at least one invalid location is stored in memory of the electronic device, and wherein when the electronic device determines the location of the electronic device is at least partially in the at least one invalid location, the electronic device changes the determined location to a valid location adjacent to the at least one invalid location.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIG. 6 is a flow chart of an exemplary method for determining a location of the electronic device in accordance with the present invention.

FIG. 7 is a flow chart illustrating an exemplary method of training the electronic device in accordance with the invention.

DETAILED DESCRIPTION OF EMBODIMENTS

Figure 1:
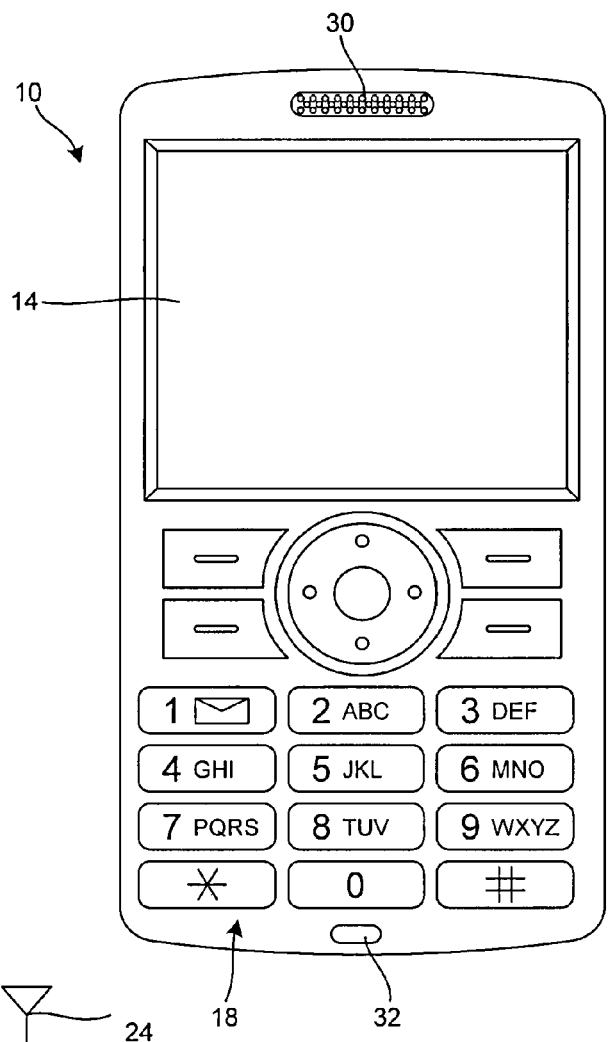
FIG. 1 is a schematic view of a mobile telephone as an exemplary electronic device in accordance with an embodiment of the present invention.

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smart phones, portable communication apparatus or the like.

In the present application, embodiments of the invention are described primarily in the context of a mobile telephone. However, it will be appreciated that the invention is not intended to be limited to the context of a mobile telephone and may relate to any type of appropriate electronic equipment, examples of which include a media player, a portable gaming device, or the like.

Figure 2:
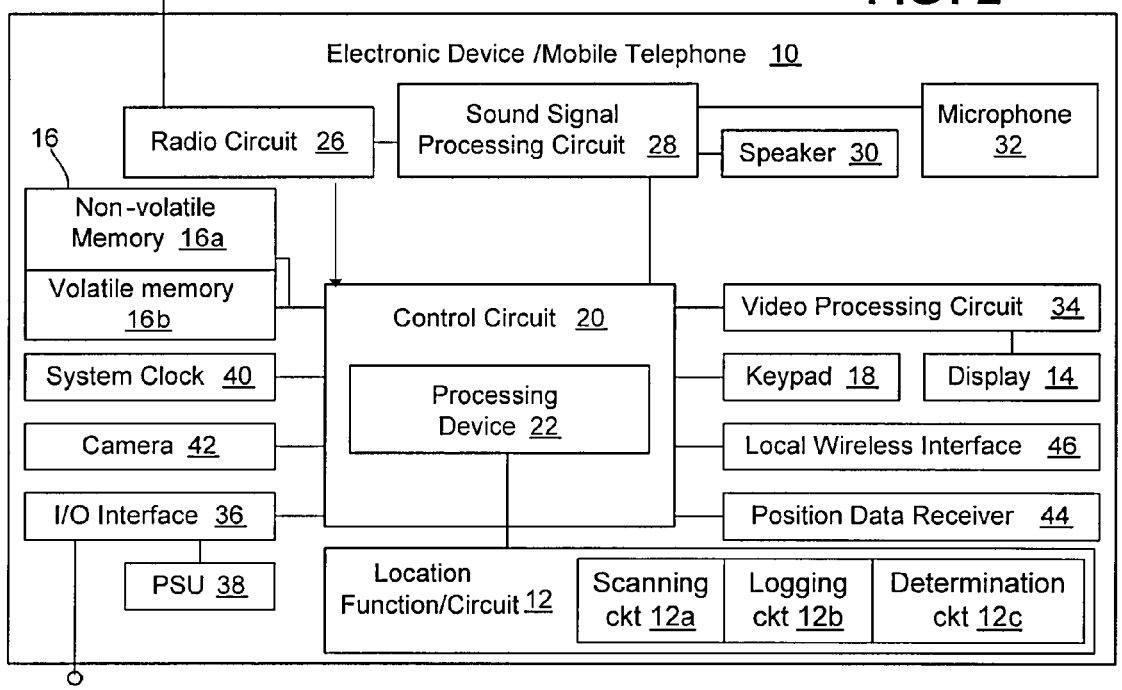
FIG. 2 is a schematic block diagram of the relevant portions of the mobile telephone of FIG. 1 in accordance with an embodiment of the present invention.

Referring initially to FIGS. 1 and 2, an electronic device 10 is shown. The electronic device 10 includes an electronic device locator function 12 that is configured to automatically determine a location of the electronic device 10 within a local area, e.g., the area defined by a home, office, retail store, warehouse, etc. Additional details and operation of the electronic device locator function 12 will be described in greater detail below. The electronic device locator function 12 may be embodied as executable code that is resident in and executed by the electronic device 10. In one embodiment, the electronic device locator function 12 may be a program stored on a computer or machine readable medium. The electronic device locator function 12 may be a stand-alone software application or form a part of a software application that carries out additional tasks related to the electronic device 10.

The electronic device of the illustrated embodiment is a mobile telephone and will be referred to as the mobile telephone 10. The mobile telephone 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The mobile telephone 10 may include a display 14. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 16 (FIG. 2) of the mobile telephone 10. The display 14 may be used to present images, video and other graphics to the user, such as photographs, mobile television content and video associated with games.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Special function keys also may include menu navigation and select keys to facilitate navigating through a menu displayed on the display 14. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 14. Also, the display 14 and keypad 18 may be used in conjunction with one another to implement soft key functionality.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The mobile telephone 10 may be configured to transmit, receive and/or process data, such as text messages (e.g., a text message is commonly referred to by some as "an SMS," which stands for short message service), instant messages, electronic mail messages, multimedia messages (e.g., a multimedia message is commonly referred to by some as "an MMS," which stands for multimedia message service), image files, video files, audio files, ring tones, streaming audio, streaming video, data feeds (including podcasts) and so forth. Processing such data may include storing the data in the memory 16, executing applications to allow user interaction with data, displaying video and/or image content associated with the data, outputting audio sounds associated with the data and so forth. FIG. 2 represents a functional block diagram of the mobile telephone 10. For the sake of brevity, generally conventional features of the mobile telephone 10 will not be described in great detail herein.

The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile telephone 10.

The memory 16 may include a read only memory area that is implemented using nonvolatile memory 16a, and a random access or system memory area that is implemented using volatile memory 16b. As will be appreciated, nonvolatile memory tends not to lose data storage capability upon loss of power and is typically used to store data, application code, files and so forth. The nonvolatile memory 16a may be implemented with a flash memory, for example. The flash memory may have a NAND architecture, but other flash memory architectures, such as a NOR architecture, may be used. As will be appreciated, volatile memory tends to lose data storage capability upon loss of power and is typically used to store data for access by the processing device 22 during the execution of logical routines. The volatile memory 16b may be a random access memory (RAM). The RAM may be a synchronous dynamic random access memory (SDRAM), for example, but other RAM architectures may be used. Data may be exchanged between the nonvolatile memory 16a and the volatile memory 16b as is conventional. The sizes of the nonvolatile memory 16a and the volatile memory 16b may be sized as is appropriate for the mobile telephone 10 or other electronic device in which the memory 16 is used.

In addition, the processing device 22 may execute code that implements the electronic device locator function 12. The electronic device locator function 12 may include sub-functions such as a scanning function 12a, a logging function 12b and a determination function 12c. Details of these functions are described in more detail below.

It will be apparent to a person having ordinary skill in the art of computer programming, and specifically in application programming for mobile telephones or other electronic devices, how to program a mobile telephone 10 to operate and carry out logical functions associated with the electronic device locator function 12. Accordingly, details as to specific programming code have been left out for the sake of brevity. Also, while the electronic device locator function 12 is executed by the processing device 22 in accordance with a preferred embodiment of the invention, such functionality could also be carried out via dedicated hardware, firmware, software, or combinations thereof, without departing from the scope of the invention. Any of these implementations may be referred to as a location circuit or simply a logic circuit. The sub-functions also may be referred as a scanning circuit 12a, logging circuit 12b and determination circuit 12c.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 16 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 28 or obtained by any other suitable method.

The mobile telephone 10 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 also may include a system clock 40 for clocking the various components of the mobile telephone 10, such as the control circuit 20. The control circuit 20 may, in turn, carry out timing functions, such as timing the durations of calls, generating the content of time and date stamps, and so forth.

The mobile telephone 10 may include a camera 42 for taking digital pictures and/or movies. Image and/or video files corresponding to the pictures and/or movies may be stored in the memory 16.

The mobile telephone 10 also may include a position data receiver 44, such as a global positioning system (GPS) receiver, Galileo satellite system receiver or the like.

The mobile telephone 10 includes a local wireless interface 46, such as an infrared transceiver and/or an RF interface (e.g., a Bluetooth interface, WiFi interface, or other short range interface), for establishing communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface. The local wireless interface 46 may include a separate transmitter and receiver, or a single transceiver.

Figure 3:
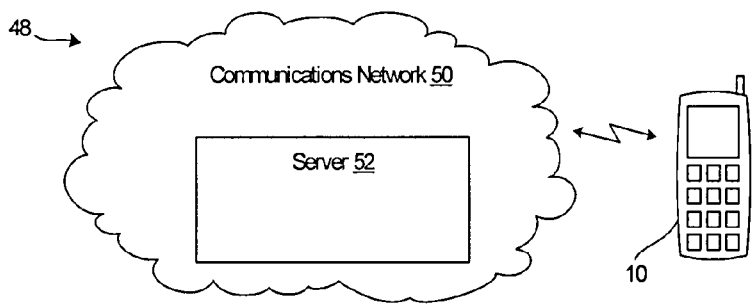
FIG. 3 is a schematic diagram of a communications system in which the mobile telephone of FIG. 1 may operate.

With additional reference to FIG. 3, the mobile telephone 10 may be configured to operate as part of a communications system 48. The system 48 may include a communications network 50 having a server 52 (or servers) for managing calls placed by and destined to the mobile telephone 10, transmitting data to the mobile telephone 10 and carrying out any other support functions. The server 52 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 50 may support the communications activity of multiple mobile telephones 10 and other types of end user devices.

As will be appreciated, the server 52 may be configured as a typical computer system used to carry out server functions and may include a processor configured to execute software containing logical instructions that embody the functions of the server 52 and a memory to store such software.

As will be described in more detail below, the mobile telephone 10 includes the location function 12, which is configured to determine a location of the mobile telephone 10 within a local area, such as a home, office, etc. The location of the mobile telephone 10 then can be used by the mobile telephone itself. For example, if it is determined that the mobile telephone 10 is in a bedroom, the mobile telephone 10 may automatically mute the ringer and enter vibrate mode. Alternatively, or in combination therewith, the location of the mobile telephone 10 may be communicated to a controller that controls the operation of various devices within the local area, Based on the location of the mobile telephone 10 within the local area, devices can be turned on/off, volume set, channels changed, etc. Further, profiles can be associated with each mobile telephone 10, wherein the profiles are tailored to specific preferences of the mobile telephone user (e.g., a preferred television channel, music station, lighting, etc.).

It is noted that the identified location of the mobile telephone 10 need not be exact. It may suffice that this information is an indication of a coarse location of the mobile telephone 10 (e.g., in which room of the local area the mobile telephone 10 is located). Further, there are various ways of determining a coarse or arbitrary location of the mobile telephone 10. In one embodiment, the mobile telephone 10 performs a signal measurement, e.g., scans the local area, monitors devices that reply to the scan, determines a signal characteristic of the replying device (e.g., a strength of the signal response, a quality of the signal response, etc.), and compares the scan data to previously obtained data (e.g., reference measurements) so as to determine a location of the mobile telephone. The mobile telephone 10 may include a database, a data table or the like for storing information about earlier signal measurements in the form of reference measurements. These reference measurements may either be collected during a training session or, alternatively, the system 50 may be adaptive and continuously learn from how the user acts together with the mobile terminal 10 and the electronic appliances 74-82. Accordingly, the mobile telephone 10 may compare a currently performed signal measurement with the reference measurements stored in the mobile telephone 10 and based on this information determine a coarse location of the mobile terminal 10.

Figure 4:
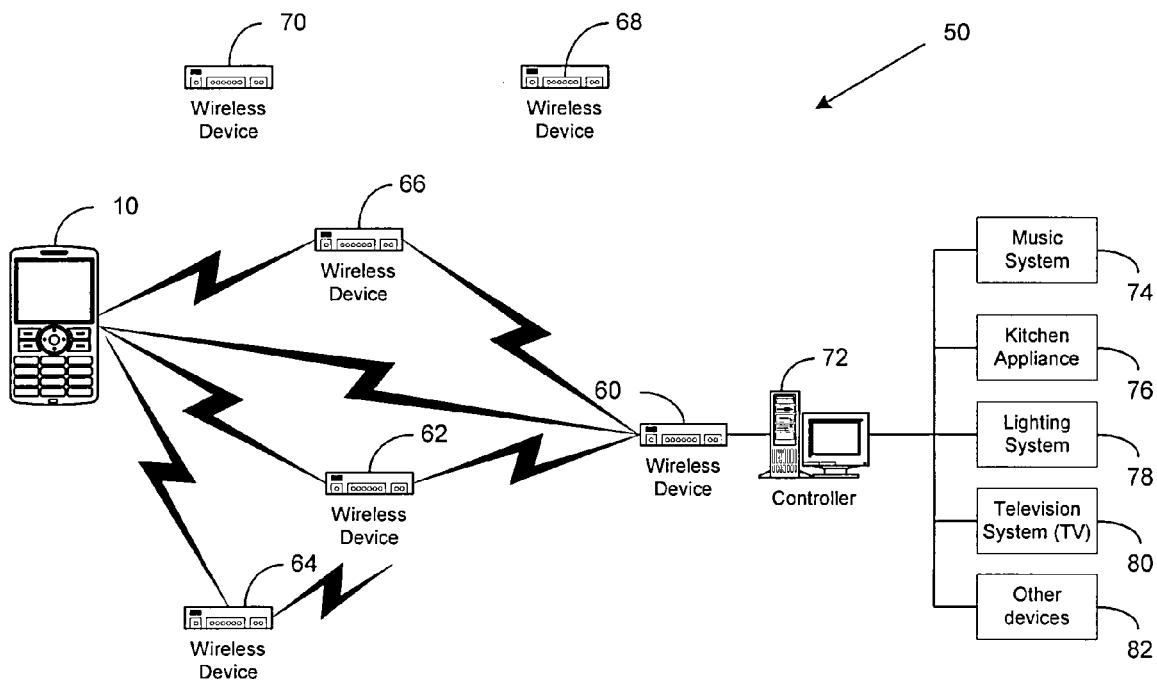
FIG. 4 is a schematic diagram illustrating a system for determining a location of an electronic device in a local area in accordance with the invention.
Figures 5, 8A, 8B:
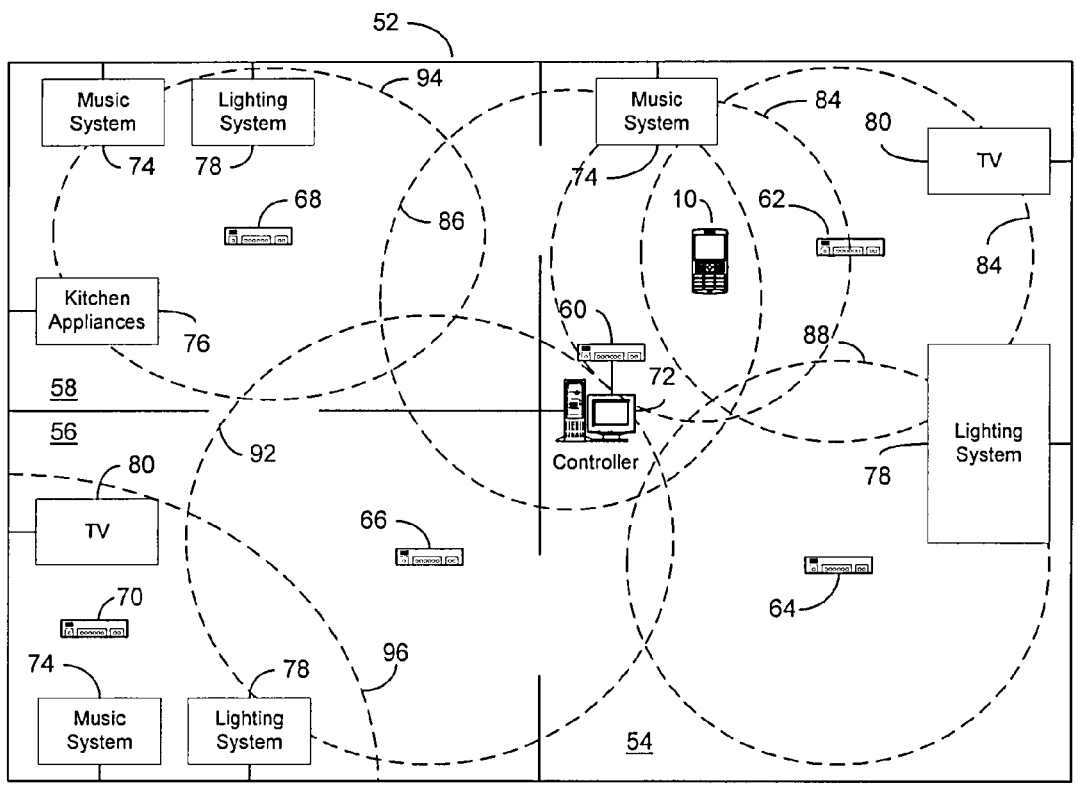
FIG. 5 is a schematic diagram illustrating operation of an electronic device in accordance with the invention in a house having three rooms.
FIGS. 8A and 8B illustrate exemplary data tables for storing location data in the electronic device in accordance with the invention.

Referring now to FIG. 4, a communication system 50 within a local area 52, such as a home environment 52 (see FIG. 5), is schematically shown. FIG. 5 illustrates a home environment 52, which includes a living room 54, a bedroom 56, and a kitchen 58. It is to be understood, however, that embodiments of the present invention can be used in any environment, including but not limited to a home environment, an office environment, a retailer environment, etc. As shown in FIGS. 4 and 5, the system 50 comprises an electronic device 10, e.g., a mobile terminal such as a mobile telephone, one or more short-range wireless devices 60, 62, 64, 66, 68 and 70 (e.g., a wireless router, wireless access point, wireless modem, etc.), a controller 72 (also referred to as an electronic apparatus 72) and one or more electronic appliances 74, 76, 78, 80, and 82 (e.g., lighting systems, audio and/or video systems, kitchen appliances, etc.). As is further disclosed in FIG. 5, the one or more short-range devices 60-70 are placed throughout the home environment 52. For example, the one or more short-range devices 60-70 may be set out throughout the home environment 52 such that there is only one or two short-range devices in each room of the home environment 52. Thus, each of the short-range devices 60-70 may be associated with a specific area, e.g., a room, of the home environment 52. In one embodiment, each of the short-range devices 60-70 is associated with an area-ID, e.g., a room-ID or the like.

The mobile telephone 10, which is located within the home environment 52, is configured to communicate, i.e., transmit and/or receive, a short-range radio signal to and/or from one or more of the short-range wireless devices 60-70 located within its short-range coverage area 84. For example, the mobile telephone 10 may be operable to communicate short-range radio signals according to the Bluetooth® technology (operable at approximately 2.4 GHz). The Bluetooth® technology is a short-range radio technology, which makes it possible to communicate radio signals over short distances, i.e., short-range radio signals, between Bluetooth enabled devices. Using the current Bluetooth® technology, the distance between communicating Bluetooth® enabled devices may be up to 10 meters in a low power mode or up to 100 meters in a high power mode. The Bluetooth® technology is well-known among persons skilled in the art and therefore will not be further described herein. Although the exemplary embodiment is described using Bluetooth® technology, it is noted that other forms of short range wireless communications may be implemented without departing from the scope of the invention.

The system 50 comprises two or more short-range devices 60-70 within the home environment. The short-range devices, for example, may be relatively simple accessory devices and/ or stand-alone short-range devices. In the disclosed embodiment, the short-range devices 60-70 are Bluetooth devices which are operable to communicate short-range radio signals according to the Bluetooth® technology described hereinabove. Each of these short-range devices 60-70 include a transmitter and receiver that is configured to communicate short-range radio signals with other short-range devices 60-70 within their respective coverage area 86, 88, 90, 92 and 94. Each of these short-range devices 60-70 is also configured to communicate short-range radio signals with the mobile telephone 10 when the mobile telephone 10 is within the coverage area of the short-range device in question. Additionally, each of the short-range devices 60-70 is configured to communicate with the controller 72. The communication between the controller 72 and each of the short-range devices 60-70 could be either via a wired connection or via a wireless connection. Furthermore, each of the short-range devices 60-70 could connect wirelessly to the controller 72 by connecting to other short-range devices 60-70 until reaching the controller 72.

In the disclosed embodiment of FIG. 5, the connection between the short-range device 60 and the controller 72 is a wired connection. However, it should be appreciated that in other embodiments this connection may be a wireless connection.

It should be appreciated that the short-range devices 60-70 are placed throughout the home environment 52. The short-range devices 60-70 may be placed throughout the entire home environment 52 such that the respective coverage areas 86-94 of the short-range devices 60-70 do not completely overlap each other. Further, the short-range devices 60-70 may be placed throughout the home environment 52 such that the respective coverage areas 86-94 of the short-range devices 60-70 together cover most of or all of the total area of the home environment 52.

Each of the short-range devices 60-70 is configured to transmit information from the mobile telephone 10 (e.g., a location as identified by the mobile telephone and discussed in more detail below) to the controller 72. In the disclosed example, each of the short-range devices may transmit said information to the controller 72 via the short-range device that is connected to the controller 72, i.e., short-range device 60 of FIGS. 4 and 5. In other words, each of the short-range devices 60-70 may transmit location information from said mobile telephone 10 to the short-range device 60 that is connected to the controller 72. The information could be transmitted to this short-range device 60 either directly or via one or more of the other short-range devices 62-70. Alternatively, the short-range devices 60-70 could be coupled to a Local Area Network (LAN) within the home environment 52 and communicate directly with the controller 72 via said LAN.

As described herein, each of the short-range devices 60-70 may be associated with a specific area, e.g., a room, of the home environment 52. Thus, there may be an association between a particular short-range device and a particular room as a starting point and, hence, the closest short-range device as determined, for example, by the strongest signal strength or shortest delay gives an indication of which room the mobile telephone 10 is located in at the time of measurement(s). The mobile telephone 10 could be trained so as to robustly determine its location even if the short-range devices are placed near a doorway. This may be accomplished by combining measurements from two or more short-range devices. For example, a strong measurement from short-range device 66, a slightly weaker signal from short-range device 68, and no signal from short-range device 62 may be interpreted as the mobile telephone 10 is in the bedroom 56. This training could occur either in a dedicated time period or over the normal usage of the system 50. In either case, it is preferable that the user provide feedback via the mobile telephone 10 during the training period. There are many learning algorithms that could be applied to this task, such as those used in gradient descent or even the less formal "neural network" categories.

In the preferred and disclosed embodiment, the controller 72 is configured to act as a central server device between the various short-range devices 60-70 and one or more electronic appliances 74-82. In one embodiment, the controller is a personal computer or the like that includes a processor, memory and input/output devices (e.g., user devices such as a keyboard, mouse and/or display, and communication devices such as one or more network interfaces, universal serial buses, etc.). Stored in memory and executable by the processor is code that implements a control function of the appliances. It should be appreciated that the controller 72 may be connected to the one or more electronic appliances 74-82 either via a wired connection or via a wireless connection. Furthermore, although not explicitly shown in the drawings, it would also be possible that the short-range devices 60-70 may be associated with and even connected to one or more of electronic appliances 74-82. For instance, short-range device 70 could be connected to the TV 80.

With additional reference to FIGS. 6 and 7, illustrated are logical operations to implement an exemplary method of determining a location of the mobile telephone 10 within a local area, such as the home environment 52. The exemplary method may be carried out by executing an embodiment of the electronic device locator function 12, for example. Thus, the flow charts of FIGS. 6 and 7 may be thought of as depicting steps of a method carried out by the mobile telephone 10. Although FIGS. 6 and 7 show a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

The logical flow for the electronic device locator function 12 may begin in block 100 where the scanning circuit 12a sets an initial power level of the mobile telephone's local wireless interface 46. The power level may be set, for example, to a low power setting, a high power setting, or some intermediate power setting. Then using the local wireless interface 46, at least part of the local area 52 is scanned by the scanning circuit 12a, as indicated at block 102. The scan may be a simple request for wireless devices in the area to identify themselves to the scanning circuit 12a. Each wireless device that receives the identification request may respond to the request by providing its identifier (e.g., a MAC address, device name, or the like) to the mobile telephone 10.

At block 104, the scanning circuit 12a measures or otherwise determines a signal characteristic of the responding device, and then the logging circuit 12b logs the responding device's identifier and corresponding signal characteristic in memory (e.g., in a database or the like). Additionally, the power level utilized by the mobile telephone's local wireless interface 46 in requesting the scan also may be logged with the device identifier and corresponding signal characteristic.

Using multiple transmission power levels to scan the local area is preferable, particularly in environments with multiple levels and/or a large number of partitions (e.g., walls) within the local area 52. For example, using high transmission power levels to perform the scan enables the mobile telephone 10 to communicate with wireless devices that may be partially shielded by walls/floors and/or devices that are a significant distance from the mobile telephone 10. Using low transmission power levels to perform the scan enables the mobile telephone 10 to focus only on those wireless devices that are in the immediate vicinity of the mobile telephone, thereby minimizing the likelihood of bad data obtained from reflections off walls/floors, etc. By scanning at a variety of transmission power levels, more data is obtained which can increase accuracy relative to scanning at a single transmission power level.

At block 104, it is determine by the scanning circuit 12a if a desired power level has been reached. For example, it may be desirable to perform the scan over several different transmission power levels of the local wireless interface 46 (e.g., a low, medium and high transmission power level). If the desired transmission power level has not been reached, then at block 108 the transmission power level of the local wireless interface 46 is changed. For example, if the initial transmission power level of the local wireless interface 46 is initially set to a maximum value, then at block 108 the power level would be decremented. Conversely, if the initial transmission power level of the local wireless interface 46 is set to a minimum value, then at block 108 the power level would be incremented. Regardless of how the transmission power level is changed, the method moves back to block 102 and repeats until the desired final transmission power level has been obtained.

Preferably, at least three different transmission power levels are used to scan the local area. However, depending on the configuration of the local area, it may be sufficient to use only a single transmission power level.

Once scans have been performed over the desired range of transmission power levels, then at block 110 the determination circuit 12c analyzes the collected data to determine a location of the mobile telephone 10 in the local area 52. For example, the various signal characteristics from each responding device and the corresponding transmission power levels may be compared with previously acquired reference measurements (e.g., measurements made during training, which is described with respect to FIG. 7 below).

For example, assume that a house/area has three rooms, and one wireless device is in each room. The devices may be labeled A, B and C, and the rooms may be labeled kitchen, bedroom and living room. FIG. 8A illustrates a simple table obtained during a training procedure that includes reference measurements for each room and device. For example, if the mobile telephone 10 is in the living room, it is known from training that the strongest signal is obtained from device A, followed by devices B and C (depending on the exact location within the living room). If the mobile phone 10 is in the bed room, the strongest signal is obtained from device B, followed by devices C and A (again, depending on the particular location in the bed room). Finally, if the mobile telephone 10 is in the Kitchen, then the strongest signal is obtained from device C, followed by devices A and B (depending on the particular location in the kitchen).

To determine the mobile telephone's location within the local area, the determination circuit 12c compares data collected during scanning of the local area 52 to data collected during training, and identifies a correlation between the two data sets. For example, if the scanning data shows that wireless device B had the strongest signal, then the mobile telephone 10 can conclude that it is in the bedroom. If the strongest signal was obtained from device A, then the mobile telephone can conclude that it is in the living room.

FIG. 8B illustrates another table that may be used to determine a location of the mobile telephone 10 in the local area 52. Like the table illustrated in FIG. 8A, the data stored therein may be obtained during a training session. In the table of FIG. 8B, each room of the local area is shown in a separate row, and each wireless device is shown in a separate column. The cell defined by the intersection of a row and column includes an expected signal characteristic (e.g., signal strength) in the corresponding room from the corresponding device. For example, if the mobile telephone 10 is in the kitchen, a signal strength of about 0-5% (e.g., based on a maximum signal strength of 100%) may be obtained from device A, 10-20% from device B and 5-15% from device C.

The determination circuit 12c can compare the scan data to the data stored in the table of FIG. 8B and ascertain a location of the mobile telephone 10 within the local area 52. For example, if the scanning circuit 12a measures a signal strength of 7% from device A, 15% from device B and 1% from device C, then the determination circuit 12c can conclude that the mobile telephone 10 is in the living room.

In some cases, there may be signal characteristic combinations that do not clearly identify the room (e.g., the determined signal strength or quality from each device may be possible for two different rooms). In such instances, the mobile telephone 10 may prompt the user to select the room from a list of possible rooms. Further, the tables of FIGS. 8A and 8B may be used independent of each other or in combination to determine a location of the mobile telephone 10.

Moving back to the flow chart of FIG. 6, once the mobile telephone 10 determines its location within the local area, that location may be communicated to the controller 72 via the wireless device 60-70, as indicated at block 112. Then at block 114, the controller, based on the communicated location, can operate the appliances 74-82 as described in more detail below.

Moving now to FIG. 7, an exemplary method of training the mobile telephone 10 in the local area is provided. Beginning at block 120, the mobile telephone 10 is placed in training mode (e.g., via a soft key or the like that commands the phone to enter training mode), and then the mobile phone provides the area with an identifier (e.g., a label such as room 1). Alternatively, the user may select the room name from a predefined list, or enter a custom room name. Once the room is given an identifier, at block 122 the user may commence training by pressing a "train now" key (e.g., a function key or the like), wherein the "train now" key instructs the scanning circuit 12a to begin scanning the room for wireless devices. During this phase, the mobile telephone 10 may instruct the user to walk around the room so as to enable the scanning circuit 12a to collect signal readings in the entire room (which then are logged by the logging circuit 12b), as indicated at block 124. As the mobile telephone 10 is moved through the room, data from responding wireless devices is obtained and stored in memory, as indicated at block 126. Once the user has traversed the entire room, he may press a "scan complete" key (e.g., another function key or the like), which indicates to the mobile telephone that the entire room has been spanned and scanning can be stopped.

At block 128, the mobile telephone 128 may prompt the user if training should be performed for additional rooms. If additional training is performed, then the user may indicate to the phone that additional training is needed (e.g., via a function key), and then the method moves back to block 120 and repeats for the new room. If training is complete, then the method ends and the mobile telephone returns to normal operation mode.

It is noted that while the above data is collected during a specific training session, training may be an ongoing operation. For example, the mobile telephone 10 may continuously or at predetermined intervals check and/or update the tables of FIGS. 8A and/or 8B. These updates and/or corrections may be based on recent measurements for a room or area, or based on errors in the determination of location (e.g., due to an error in location, the user manually changed the room via keypad entry).

Once training for a particular room has been completed, the logging circuit 12b can store the collected data in memory of the phone, as indicated at block 126. The data may be stored in the format indicated in FIGS. 8A and 8B, for example, or in any other format that facilitates identification of the local area based on the collected signal characteristic. The reference data now is ready for use by the mobile telephone 10.

It is noted that since Bluetooth or WiFi omni-directional antennas normally do not have perfect omni-directional abilities, the location function 12 can be enhanced using multiple measurements. For example, while it is preferable to perform scans at three transmission power levels and to establish a response from at least three wireless devices, more than three transmission power levels may be implemented and/or responses may be obtained from more than three different wireless devices. These multiple measurements then may be averaged and, based on the average, a location of the mobile telephone 10 can be ascertained.

Another possibility is to identify predetermined barriers (e.g., walls, floors, furniture, etc.) to rule out impossible locations. Then, should the mobile telephone identify a location that is not physically possible, the nearest feasible location may be used as the current location (e.g., in room A or room B, etc.). These pre-determined barriers, which may be determined during a training session, may be stored in memory of the mobile telephone 10 and identified therein as impossible locations.

Embodiments of the invention may be used for a wide variety of electronic appliances. Exemplary electronic appliances include a TV, a music system, a lighting system, a kitchen appliance, a home entertainment system, a personal computer (PC), a telephone or even the mobile telephone 10, etc. In the disclosed embodiment, the controller 72 may be configured to receive the information regarding the determined location of the mobile telephone 10 from the short-range device that is connected to the controller 72, i.e., short-range device 60 in this example. In the disclosed embodiment, the controller 72 is further configured to use this information for controlling one or more of the electronic appliances 74-82 in dependence thereof. Accordingly, the one or more electronic appliances 74-82 may be controlled in dependence of where in the local area 52 the mobile telephone 10 is located. It should be appreciated that the electronic appliances 74-82 could be controlled either separately or simultaneously by means of the controller 72.

The system 50 according to embodiments of the invention provide for controlling the operation of one or more electronic appliances 74-82 within the local area 52 in dependence of where in the local area 52 the mobile telephone 10 is located. When the user and the mobile telephone 10 of the user are in the same location (which is most often the case) location-dependent services can be provided within the local area 52 in dependence of where in the local area the user is currently located. Accordingly, when the user is in a particular room of the home environment 52, the location of his/her mobile telephone 10 may trigger a change of the behavior of one or more electronic appliances in that room. For example, when it is determined that a certain short-range device 62 in the living room is closest to the mobile telephone, the lighting device 78 of the living room and the TV 80 of the living room may be switched on. As another illustrative example, when it is determined that another certain short-range device 68 in the kitchen is closest to the mobile telephone 10, one or all of the music system 74 of the kitchen, the kitchen appliances 76, and the lighting device 78 of the kitchen may be turned on.

Embodiments of the invention may be employed in different scenarios, some of which will now be explained. One such scenario involves a music service, which provides the user of mobile telephone 10 with music as the user moves around in the home environment 52. If there is provided a music system 74 with a loudspeaker in each of the rooms of the home environment 52, the music may follow the user when the user moves from one room to another. Accordingly, when the user brings his/her mobile telephone 10 with himself/herself as he/she enters a new room, e.g., the bedroom, the audio of the music system may be transferred to that room and simultaneously turned off in the previously left room, e.g., the living room.

Another scenario involves a lighting service, which provides the user of mobile telephone 10 with lighting as the user moves around in the home environment 52. If there is provided a lighting system 78 in the local area with lighting devices in each of the rooms of the home environment 52, the lighting may follow the user when the user moves from one room to another. Accordingly, when the user brings his/her mobile telephone 10 with himself/herself as he/she enters a new room, e.g., the kitchen, the light may be turned on in that room and simultaneously turned off in the previously left room, e.g., the living room.

Still another scenario involves an alarm service. For example, when it is determined that the user moves away from the coverage area of all short-range devices of the home environment 52, this could trigger the activation of an alarm system to prevent burglary.

Yet another scenario involves personalizing various services in dependence of who the user is. For example, the music service described above can be personalized in dependence of who is in the room. As another example, the displaying of information on various electronic appliances, e.g., the TV, may be changed in dependence of who is in the room. For example, it would be possible to associate a profile or set of profiles, either at controller 72 or associated with each electronic appliance 74-82 or even communicated from the mobile telephone 10. Hence, the correct profile, i.e., the one associated with a particular phone 10 and its associated user, would be set in the electronic appliance to, for instance, cause a subset of music to be played, or a subset of TV channels to be available on TV 80, or a subset of images to be displayed on a viewer (e.g., a digital picture frame, the TV), or preferred light level to the set. The profiles are communicated or otherwise activated in the electronic appliances in the room in which the user with his/her mobile telephone 10 is presently in.

Further, the user interface on the mobile telephone 10 may be changed to correspond to the particular room. For example, if the user is watching television and moves to another room that also includes a television, then, in addition to turning the television on in the new room and turning the television off in the previous room, the user interface on the mobile telephone may provide information on the current program (e.g., a program guide, summary of the program, length of program, etc.). Also, the user interface on the mobile telephone 10 may display only those channels that are enabled for that particular profile.

In yet another example, embodiments of the present invention can simplify the use of nearby devices. For example, if the user wishes to change the volume of the music in the current room, he may use the mobile telephone to increase or decrease the volume, turn the music on or off. Similarly, television volume may be increased/decreased, channels changed, etc. all from the mobile telephone 10.

In still a further scenario, embodiments of the present invention may be utilized for a plurality of mobile terminals, e.g., mobile telephones, simultaneously. This could provide for a system where multiple mobile terminals cause multiple operations at various locations of the local area, e.g., the home environment 52. For example, as explained above, multiple users with multiple mobile telephones 10 could be associated with profiles for each electronic appliance and for each user (or more correctly each mobile telephone of the user). For example, there could be an a priori ranking of profiles (e.g., mobile telephone associated with father has a higher priority than that of the son or daughter but not that of the wife).

Accordingly, the behavior of consumer electronic appliances can be changed based on which phone is located in the same room as the electronic appliances.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for identifying a location of an electronic device within a local area, comprising:

storing in the electronic device at least one invalid location;

determining a signal characteristic of a wireless communication from one or more wireless devices in the local area to the electronic device, said determining performed by the electronic device;

determining the location of the electronic device based on a comparison of the determined signal characteristic from the one or more wireless devices to a plurality of reference signal characteristics, wherein when the determined location of the electronic device is at least partially in the at least one invalid location, changing the determined location to a valid location adjacent to the at least one invalid location.

2. The method of claim 1, wherein determining a signal characteristic includes:

performing a wireless scan of the local area at a plurality of different transmission power levels; and logging an identifier and a responding signal characteristic of the one or more wireless devices that respond to the scan, and the transmission power level used to perform the scan.

3. The method of claim 2, wherein determining the location includes comparing the logged data for each wireless device to determine which wireless device is closest to the electronic device.

4. The method of claim 2, wherein determining the signal characteristic includes using a transmitter and receiver of the electronic device that are operative to implement at least one of a Bluetooth protocol or a WiFi protocol.

5. The method of claim 1, further comprising controlling at least one electronic appliance in the local area based on the location of the electronic device in the local area.

6. The method of claim 5, wherein controlling at least one electronic appliance includes controlling at least one of a television system, an audio system, a lighting system, a kitchen appliance, a home entertainment system, a personal computer system, a telephone system, or an alarm system.

7. The method of claim 5, wherein the at least one electronic appliances is controlled based on a profile associated with the electronic device and the at least one electronic appliance, said profile including at least one preferred setting for the electronic appliance.

8. The method of claim 7, further comprising prioritizing a plurality of profiles that are usable in the local area, wherein settings of at least one profile can override settings of another profile.

9. The method of claim 5, further comprising controlling the at least one appliance from a user interface on the electronic device.

10. The method of claim 1, further comprising changing, based on the determined location of the electronic device, at least one of a user interface of the electronic device or an operational characteristic of the electronic device.

11. The method of claim 1, further comprising prior to performing the scan, collecting the plurality of reference signal characteristics and storing said reference signal characteristics in memory.

12. A method for using an electronic device to identify a location of the electronic device within a local area, wherein said electronic device includes a short range wireless transceiver, comprising:
storing in the electronic device at least one invalid location;
using the short range transceiver to scan for wireless devices in the local area;
collecting in the electronic device an identifier of each wireless device that responds to the scan, and a signal characteristic of the responding wireless device; and
determining the location of the electronic device in the local area based on the logged data,
wherein when the determined location of the electronic device is at least partially in the at least one invalid location, changing the determined location to a valid location adjacent to the at least one invalid location.

13. The method of claim 12, wherein the scan is performed at at least two different transmission power levels.

14. A portable electronic device, comprising:
a short range wireless transmitter and receiver;
a scanning circuit operative to command the wireless transmitter and receiver to perform a scan for wireless devices in at least part of a local area, and to determine a signal characteristic of a response to the scan;
a logging circuit operative to log in memory of the electronic device an identifier of the responding wireless devices and the corresponding signal characteristic; and
a determination circuit operative to determine a location of the electronic device within the local area based on the logged data,
wherein at least one invalid location is stored in memory of the electronic device, and wherein when the determination circuit determines the location of the electronic device is at least partially in the at least one invalid location, the determination circuit changes the determined location to a valid location adjacent to the at least one invalid location.

15. The electronic device of claim 14, wherein the scanning circuit is further operative to perform the scan a plurality of different transmission power levels, and the logging circuit is operative to log each identifier and signal characteristic with the corresponding transmission power level.

16. The electronic device of claim 14, wherein determination circuit is operative to compare the logged data to reference data to determine which wireless device is closest to the electronic device.

17. The electronic device of claim 14, wherein the wireless transmitter and receiver operate based on a Bluetooth protocol or a WiFi protocol.

18. The electronic device of claim 14, further comprising a control circuit operative to control at least one electronic appliance in the local area based on the determined location of the electronic device in the local area.

19. The electronic device of claim 18, wherein the control circuit is operative to control the at least one electronic appliance based on a profile associated with the electronic device and the at least one electronic appliance, said profile including at least one preferred setting for the electronic appliance.

20. The electronic device of claim 18, further comprising a display for displaying a user interface, wherein the at least one appliance is controllable from the user interface.

21. The electronic device of claim 20, wherein the control circuit is operative to change at least one of the user interface or an operational characteristic of the electronic device based on a location of the electronic device.

22. The electronic device of claim 14, wherein the electronic device is a mobile telephone.

23. A system for controlling the operation of at least one electronic appliance within a local area, comprising:
the portable electronic device configured to determine a location of the electronic device within a local area;
a plurality of wireless devices arranged within the local area;
a controller operatively coupled to the at least one electronic appliance, wherein the electronic device is operative to wirelessly provide the location of the electronic device within the local area to the controller, and the controller is operative to control the operation of the at least one electronic appliance based on the location of the electronic device in the local area,
wherein at least one invalid location is stored in memory of the electronic device, and wherein when the electronic device determines the location of the electronic device is at least partially in the at least one invalid location, the electronic device changes the determined location to a valid location adjacent to the at least one invalid location.

24. The system of claim 23, wherein the at least one electronic appliances is controlled based on a profile associated with the electronic device and the at least one electronic appliance, said profile including at least one preferred setting for the electronic appliance.

25. The system of claim 24, wherein each profile associated with each electronic device in the local area is prioritized, and wherein settings of at least one profile can override settings of another profile.

26. The system of claim 23, wherein the electronic device, via a user input device, is operable to remotely control the at least one electronic appliance.

* * * * *